(12) United States Patent
Klaba (10) Patent No.: US 10,261,931 B2
(45) Date of Patent: Apr. 16, 2019

(54) MODULAR BACKPLANE

(71) Applicant: OVH, Roubaix (FR)

(72) Inventor: Miroslaw Pierre Klaba, Roubaix (FR)

(73) Assignee: OVH, Roubaix (FR)

( * ) Notice: Subject to any disclaimer, the term of this patent is extended or adjusted under 35 U.S.C. 154(b) by 0 days.

(21) Appl. No.: 15/761,644

(22) PCT Filed: Sep. 22, 2015

(86) PCT No.: PCT/EP2015/071801
§ 371 (c)(1),
(2) Date: Mar. 20, 2018

(87) PCT Pub. No.: WO2017/050359
PCT Pub. Date: Mar. 30, 2017

(65) Prior Publication Data
US 2018/0349309 A1 Dec. 6, 2018

(51) Int. Cl.
*G06F 13/40* (2006.01)
*G06F 13/42* (2006.01)

(52) U.S. Cl.
CPC ........ *G06F 13/4027* (2013.01); *G06F 13/409* (2013.01); *G06F 13/4282* (2013.01); *G06F 2213/0032* (2013.01)

(58) Field of Classification Search
CPC ............. G06F 13/4027; G06F 13/4282; G06F 13/409; G06F 2213/0032
See application file for complete search history.

(56) References Cited

U.S. PATENT DOCUMENTS

| | | | | | |
|---|---|---|---|---|---|
| 4,700,274 | A | * | 10/1987 | Laut | G06F 13/409 361/729 |
| 4,811,275 | A | * | 3/1989 | Balogh, Jr. | G06F 3/0601 361/679.32 |
| 7,447,273 | B2 | * | 11/2008 | Hsu | H04L 1/22 333/262 |
| 8,155,520 | B1 | * | 4/2012 | West | G02B 6/43 398/50 |
| 9,736,052 | B2 | * | 8/2017 | Wittenschlaeger | G06F 9/54 |
| 2003/0101426 | A1 | * | 5/2003 | Sarkinen | H04L 45/00 716/126 |

OTHER PUBLICATIONS

International Search Report with regard to PCT/EP2015/071801 dated Jun. 8, 2016.

* cited by examiner

*Primary Examiner* — Henry Tsai
*Assistant Examiner* — Christopher Daley
(74) *Attorney, Agent, or Firm* — BCF LLP (57) ABSTRACT

A backplane (1) comprising —a first module connector (2*d*) configured to receive a first printed circuit board module (5*d*) and including a first connector portion (23*d*-26*d*); —a second module connector (2*e*) configured to receive a second printed circuit board module (5*e*) and including a second connector portion (23*e*-26*e*), the first connector portion (23*d*-26*d*) being connected to the second connector portion (23*e*-26*e*) through a backplane bus.

19 Claims, 4 Drawing Sheets

| MiniCard Pinout | | | |
|---|---|---|---|
| Pin # | Signal name | Pin# | Signal name |
| 51 | +3.3V | 52 | +3.3V |
| 49 | SGMII1_RXN | 50 | GND |
| 47 | SGMII1_RXP | 48 | SGMII1_TXP |
| 45 | GND | 46 | SGMII1_TXP |
| 43 | GND | 44 | GRN |
| 41 | SATA1_RXN | 42 | GRN |
| 39 | SATA1_RXP | 40 | SATA1_TXP |
| 37 | GND | 38 | SATA1_TXN |
| 35 | GND | 36 | GRN |
| 33 | SATA0_RXN | 34 | GRN |
| 31 | SATA0_RXP | 32 | ATA0_TXN |
| 29 | GND | 30 | ATA0_TXP |
| 27 | GND | 28 | GRN |
| 25 | SGMII0_RXN | 26 | GRN |
| 23 | SGMII0_RXP | 24 | SGMII0_TXP |
| 21 | GND | 22 | SGMII1_TXN |
| 19 | UART_RXD | 20 | GND |
| 17 | UART_TXD | 18 | RESET |
| Mechanical Key | | | |
| 15 | MDIO | 16 | GND |
| 13 | MDC | 14 | I2C_SDA |
| 11 | GND | 12 | I2C_SCL |
| 9 | GND | 10 | GND |
| 7 | SERDES_RXN | 8 | GND |
| 5 | SERDES_RXP | 6 | SERDES_TXN |
| 3 | GND | 4 | SERDES_TXP |
| 1 | +3.3V | 2 | +3.3V |

FIG.4

MODULAR BACKPLANE

FIELD OF THE INVENTION

The present invention relates generally to data storage systems and more specifically to backplanes intended to be incorporated within such data storage systems.

BACKGROUND OF THE INVENTION

As more and more online applications and services are being made available over networks (such as Internet, intranets, and/or extranets), network operators (or service providers) are asked to keep their data storage systems up-to-date with the latest technological advances.

In this regard, backplane-based data servers or storage servers are mainly composed of backplanes disposed in a chassis and to which a plurality of printed circuit board modules (or service cards) and storage units are mounted.

In particular, printed circuit board modules are subject to constant innovative research and design so as to meet constantly changing requirements. This concerns both hardware and software components of printed circuit board modules (e.g. processors, clock generators, chips, digital signal processor, FPGA, switches, processing algorithms).

Accordingly, ever evolving printed circuit board modules induce a strong need for permanent upgrade of data storage systems so that improving online data processing and enabling high-speed remote storing and retrieving data.

However, current backplane structures are inflexible so that upgrading or adding a particular printed circuit board module may require the replacement of the entire backplane. This results in significant expenses and delays associated with systems disassembly and assembly. It is usually undesirable, even intolerable, whether for small, medium, or large-size data storage systems on which a given business depends.

Moreover, current backplanes provide connectors for receiving in a fixed and predefined arrangement of individual printed circuit board modules. In others words, up-to-date backplanes provide a fixed correspondence between module connectors and backplane storage unit connectors. Therefore, customized interconnections, intended for a given achievement, between printed circuit board modules are not supported by current backplanes.

In addition, including in the chassis further backplanes adapted to meet specific operating requirements to be performed by up-to-date printed circuit board modules is another challenging problem. In fact, this results in increased expenses and inconvenience in terms of hardware usage, power, and cooling consumption.

Hence, because of lack of modularity and flexibility of current backplanes, data storage systems upgrade with new data processing methods and/or printed circuit board modules usually turns into heavy investment for service providers, and especially for those having a great number of backplane-based servers.

One object of the present invention is to overcome many or all of the above-discussed shortcomings of currently available backplanes, and offers other advantages over the prior art.

Another object of the present invention is to propose a backplane providing an extra degree of flexibility for upgrading printed circuit board modules mounted thereto.

Another object of the present invention is to propose a backplane architecture enabling flexible use of module connectors.

Another object of the present invention is to promote printed circuit board modules advances that enable high performance remote data processing, storing and retrieving.

Another object of the present invention is to propose a modular backplane which reduces costs of printed circuit board modules upgrading.

Another object of the present invention is to propose a modular backplane enabling various use cases of the module connectors so that printed circuit board modules mounted thereto could perform particular processing tasks.

Another object of the present invention is to propose a module connector compatible with existing bus standards.

SUMMARY OF THE INVENTION

Various embodiments are directed to addressing the effects of one or more of the problems set forth above. The following presents a simplified summary of embodiments in order to provide a basic understanding of some aspects of the various embodiments. This summary is not an exhaustive overview of these various embodiments. It is not intended to identify key of critical elements or to delineate the scope of these various embodiments. Its sole purpose is to present some concepts in a simplified form as a prelude to the more detailed description that is discussed later.

Various embodiments relate to a backplane comprising
a first module connector configured to receive a first printed circuit board module and including a first connector portion;
a second module connector configured to receive a second printed circuit board module and including a second connector portion, the first connector portion being connected to the second connector portion through a first backplane bus.

In accordance with a broad aspect, the backplane further comprises a third module connector configured to receive a third printed circuit board module, this third module connector including a third connector portion, wherein the second module connector further includes a fourth connector portion, the fourth connector portion being connected to the third connector portion through a second backplane bus.

In accordance with another broad aspect, the first backplane bus is a SATA bus or an Ethernet bus.

In accordance with another broad aspect, the second backplane bus is a SATA bus or an Ethernet bus.

Various embodiments further relate to a printed circuit board module configured to be plugged into the second module connector of the above backplane, comprising a card edge connector, this card edge connector including a first card edge connector portion adapted to be received by the said second connector portion of the said second module connector, and a second card edge connector portion, this second card edge connector portion being cross-connected to the first card edge connector portion.

In accordance with a broad aspect, the second card edge connector portion is adapted to be received by the said forth connector portion of the second module connector of the backplane.

Various embodiments further relate to a method for connecting a first printed circuit board module plugged into a first module connector of a backplane to a second printed circuit board module plugged into a second module connector of the backplane, this method comprising a first connection step, through a first backplane bus, of a first connector portion of the first module connector to a second connector portion of the second module connector.

In accordance with a broad aspect, the above method further comprises a second connection step, through a second backplane bus, of a forth connector portion of the second module connector to a third connector portion of a third module connector of the backplane, a third printed circuit board module being plugged into the said third module connector.

In accordance with another broad aspect, the first backplane bus is a SATA bus or an Ethernet bus.

In accordance with another broad aspect, the second backplane bus is a SATA bus or an Ethernet bus.

Various embodiments further relate to a data storage system including the above backplane.

While the various embodiments are susceptible to various modification and alternative forms, specific embodiments thereof have been shown by way of example in the drawings. It should be understood, however, that the description herein of specific embodiments is not intended to limit the various embodiments to the particular forms disclosed.

It may of course be appreciated that in the development of any such actual embodiments, implementation-specific decisions should be made to achieve the developer's specific goal, such as compliance with system-related and business-related constraints. It will be appreciated that such a development effort might be time consuming but may nevertheless be a routine understanding for those or ordinary skill in the art having the benefit of this disclosure.

DESCRIPTION OF THE DRAWING

The objects, advantages and other features of the present invention will become more apparent from the following disclosure and claims. The following non-restrictive description of preferred embodiments is given for the purpose of exemplification only with reference to the accompanying drawings in which:

Throughout the specification, similar reference numerals refer to similar or identical elements in all figures of the drawing.

DETAILED DESCRIPTION OF ILLUSTRATIVE EMBODIMENTS

Figure 1:
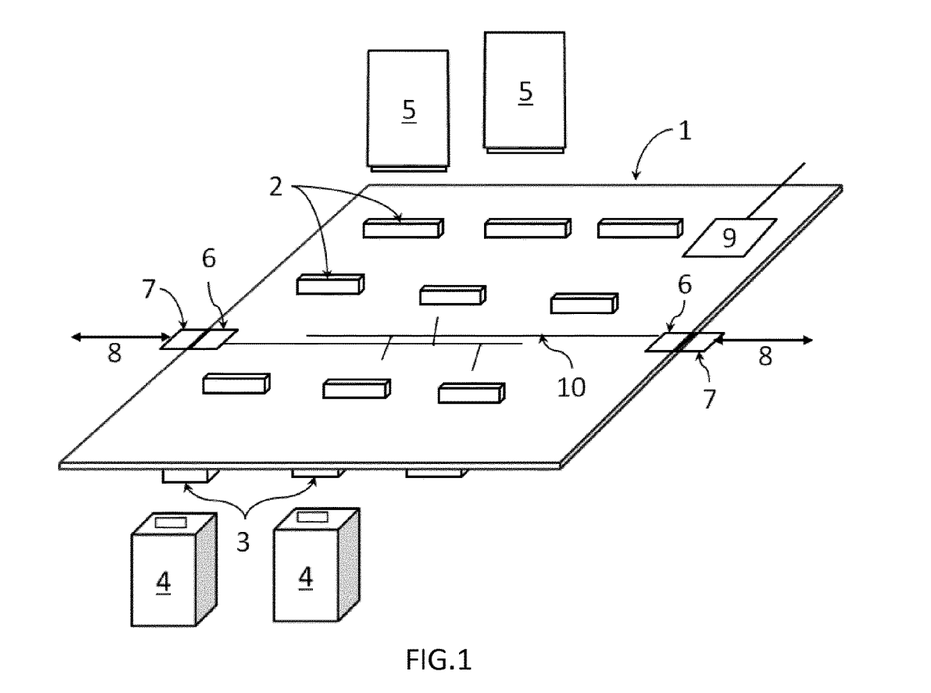
FIG. 1 is a block diagram illustrating a backplane according to various embodiments.

With reference to FIG. 1, there is shown a block diagram representation of a backplane 1. Such a backplane may be affixed in a rack-mountable chassis, or included within a data server or more generally within a data storage system.

This backplane 1 includes a docking base configured to receive a plurality of storage units 4 and printed circuit board modules 5 which holds them coupled and remotely accessible. Removable storage units 4 and removable printed circuit board modules 5 may be mounted to the backplane 1 through appropriate backplane connectors 2-3.

In fact, the backplane 1 comprises
a set of storage backplane connectors 3 configured to receive correspondent connectors of storage units 4;
a set of module connectors 2 (also said slots or card backplane connectors) configured to receive correspondent card edge connectors of printed circuit board modules 5 (i.e. adapted to have plugged therein printed circuit board modules 5);
one or more network interfaces 7 (such as a Ethernet network interface) which are connectable with a network and exchange data therewith according to a network protocol;
one or more switch 6 and backplane buses 10 (transmission lines) configured to interconnect, according to predefined bus protocols, storage backplane connectors 3, module connectors 2 and network interfaces 7. The backplane buses 10 are adapted to enable standard interfaces, such as SAS (Serial Attached Small Computer System Interface) bus, SATA (Serial Advanced Technology Attachment) bus, Peripheral Component Interconnect (PCI) bus, PCI express (PCIe) bus, PCI extended (PCI-X) bus, or Ethernet bus;
a shared power connector 9 to receive input power and supply, preferably, regulated electric power to electronic components mounted to the backplane 1.

In the illustrative embodiment of FIG. 1, the backplane 1 comprises two network interfaces 7. A network interface may be connected to a first common communication bus 8 such as a Gigabit Ethernet bus, while the other may be connected to a second common communication bus 8 such as an Intranet connection (e.g. a management network or an inter/intra data-center network), or any other port providing network connectivity to the backplane 1.

Thus, the printed circuit board modules 5 and the storage units 4 may be remotely accessed through the network interfaces 7 based on backplane Ethernet standard, such as 10GBASE-KR, 10GBASE-KX4, or 40GBASE-KR4.

The switch 6 enables, through backplane buses 10 (for instance, PCIe bus, SATA bus or Ethernet bus), printed circuit board modules 5 connection to their corresponding storage units 4.

Storage backplane connectors 3 are configured to receive hard disk drives (HDDs). More generally, the storage unit 4 may be one or more hard disk(s) or any other appropriate data storage device (e.g. CD-ROM drives, or DVD drives). Module connectors 2 are connected to one or more storage backplane connectors 3 through the backplanes buses 10 (for instance, SATA buses or any other bus interface that connects the module connector 2 to mass storage devices such as hard disk drives).

Storage units 4 are used for read and write operations under the control of respective printed circuit board modules 3 (in accordance with local instructions and/or received ones through the Ethernet connection 8). For example, a printed circuit board module 5 may be in charge of data verification (error detection and correction), data formatting for storage in one or more storage unit 4, data compression/decompression, and/or data encryption/decryption). To that end, the printed circuit board module 5 may include a processor or a Central Processing Unit (i.e. a CPU card), memory circuits for temporary storage of data within this printed circuit board module 5, and any other electronic components known in the art for fabricating a printed circuit board. The processor may be any general purpose or application specific processor (such as, Armada 6040/8020, ArmadaXP, Armada 385, or Armada 8040). More generally, the function(s) of the printed circuit board modules 5 are not part of the present invention, so that any desirable function may be performed thereby, without getting out of the scope of the various embodiments.

Figure 2:
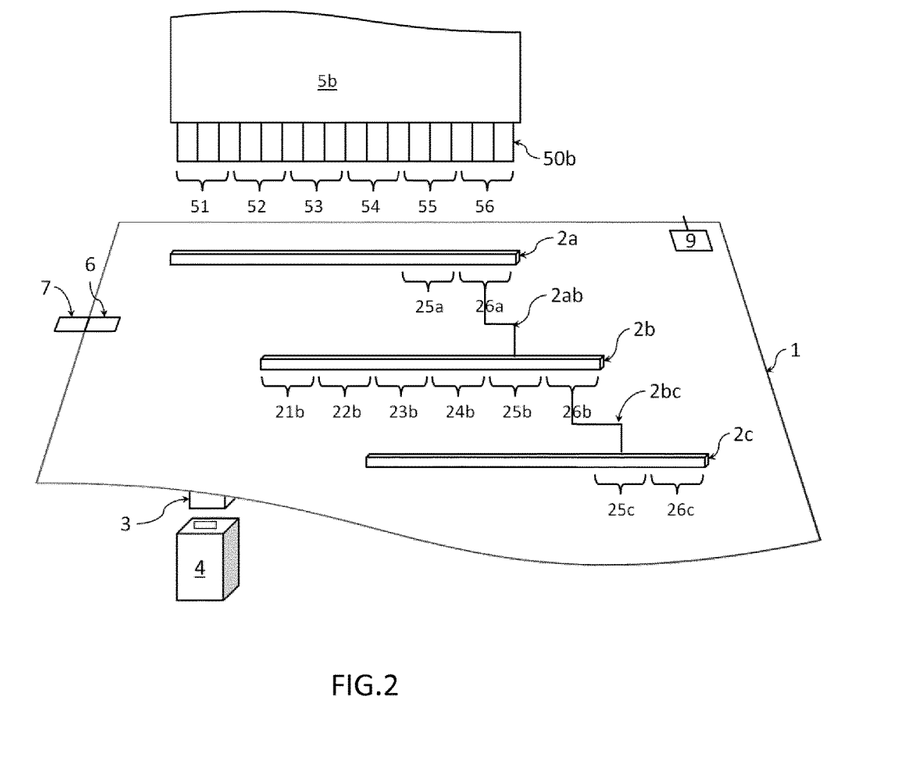
FIG. 2 is a block diagram illustrating module connectors and a card edge connectors according to various embodiments.

Referring now to FIG. 2, the module connectors 2a, 2b, 2c, respectively, include a plurality of connector portions 25a-26a, 21b-26b, 25c-26c.

The connector portion 21b is dedicated for power and control signals. Pins of this connector portion 21b are coupled to the power connector 9. Therefore, the printed circuit board module 5b plugged into the module connector 2b receives power feeds through the connector portion 21b.

The connector portion 22b is connected to the switch 6, and thereby to the network interface 7.

The connector portion 23b is connected to the storage backplane connector 3. In one embodiment, the connector portion 23b is a SATA (or, alternatively, SAS) interface. This SATA interface is operable to send and receive storage data to and from the storage unit 4.

The connector portion 24b is connected to the storage backplane connector 3 through an Ethernet bus.

The connector portion 25b of the module connector 2b is connected to the connector portion 26a of the module connector 2a. It results in that the printed circuit module 5b plugged into the module connector 2b may be connected to the printed circuit board module plugged into the module connector 2a. In one embodiment,
  the connector portion 26a is an output connector portion for the module connector 2a (for instance, SATA output or Ethernet output); and
  the connector portion 25b is an input connector portion for the module connector 2b (respectively, SATA input or Ethernet input).

The connector portion 26b of the module connector 2b is connected to the connector portion 25c of the module connector 2c. It results in that the printed circuit module 5b plugged into the module connector 2b may be connected to the printed circuit board module plugged into the module connector 2c. In one embodiment,
  the connector portion 26b is an output connector portion for the module connector 2b (for instance, SATA output or Ethernet output); and
  the connector portion 25c is an input connector portion for the module connector 2c (respectively, SATA input or Ethernet input).

The connector portions 25a and 26a (respectively, 25c and 26c) may be, respectively, an input connector portion and an output connector portion for the module connector 2a (respectively, 2c).

Consequently, the printed circuit module 5b plugged into the module connector 2b may be connected (or coupled) to both or either of the printed circuit board module plugged into the module connector 2a (said previous module) and the printed circuit board module plugged into the module connector 2c (said next module).

To that end, the backplanes buses 10 include
  a first backplane bus (strip transmission lines 2ab providing, for example, a SATA bus or an Ethernet bus) for connecting the connector portion 26a of the module connector 2a to the connector portion 25b of the module connector 2b; and
  a second backplane bus (strip transmission lines 2bc providing, for example, a SATA bus or an Ethernet bus) for connecting the connector portion 26a of the module connector 2a to the connector portion 25c of the module connector 2c.

Further backplane buses (including conventional SATA buses and Ethernet buses) connect the other connector portions to storage backplane connectors 3 and to the switch 6 and/or the network interfaces 7 available on the backplane 1.

The card edge connector 50b of the printed circuit board module 5b is adapted to mate with the module connector 2b. Similarly, this card edge connector 50b includes a plurality of connector portions 51-56. The card edge connector portions 51-56 are adapted to be received, respectively, by connector portions 21b-26b. The mating of the connector portions 55 and 56 of the card edge connector 50b, respectively, with the connector portions 25b and 26b of the module connector 2b provides communication signals between this printed circuit board module 5b and others printed circuit board modules mounted to the backplane 1. In fact, when it is plugged into the module connector 2b, the printed circuit board module 5b may
  send data to or and receive data from a first printed circuit board module plugged into the module connector 2a through the transmission lines 2ab (e.g. through the SATA bus or Ethernet bus 2ab); and/or
  send data to or receive data from a second printed circuit board module plugged into the module connector 2c through the transmission lines 2bc (e.g. through the SATA bus or Ethernet bus 2bc).

Thus, performing given processing operations on data to be remotely stored in or retrieved from storage units 4 may be distributed among a plurality of printed circuit board modules 5 mounted to the backplane 1.

The module connector 2b comprises, as shown in FIG. 2, six connector portions 21b-26b wherein only 25b and 26b are connected to other module connectors 2a and 2c of the backplane 1. However, neither the total number of connector portions 21b-26b of a given module connector 2b, nor the number of the connector portions 25b-26b connected to other module connectors are limited to those shown in FIG. 2 for illustration purpose only.

Connector portions 21b-26b do not need to have identical number of pins. Moreover, both the module connector 2b and the printed circuit board module 5b may contain mechanical guiding mechanisms and mechanical keys to insure proper mating.

Figure 3:
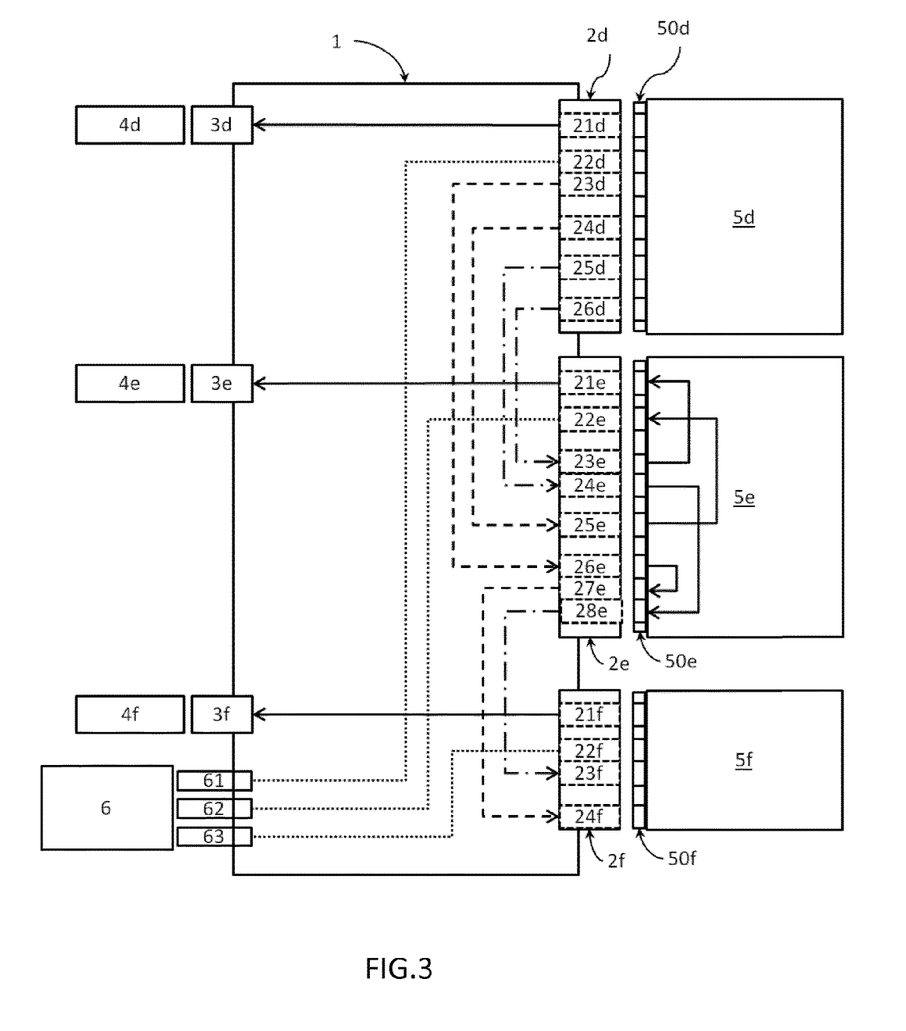
FIG. 3 is a block diagram illustrating printed circuit board modules mounted to a backplane according to various embodiments.

With reference to FIG. 3, showing a transversal view of the backplane 1, the printed circuit board modules 5d, 5e, and 5f are, respectively, plugged into their correspondent module connectors 2d, 2e and 2f. The module connectors 2d, 2e and 2f are adapted to mate with the card edge connectors 50d, 50e, and 50f.

The connector portions 21d, 21e and 21f are, respectively, connecting (for example through SATA buses) the printed circuit board modules 5d, 5e and 5f to storage unit 4d, 4e and 4f which are, respectively, mounted to the backplane 1 through storage backplane connector 3d, 3e and 3f.

The printed circuit board module 5d, 5e, and 5f are, respectively, connected, via the connector portions 22d, 22e and 22f, to the port 61-63 of the switch 6 through Ethernet buses (represented by dotted lines in FIG. 3).

A plurality of connectors portions of the module connector 2d, the module connector 2e and the module connector 2f are interconnected through backplanes buses such as Ethernet buses (represented by dash lines in FIG. 3) and/or SATA buses (represented by dash-dot lines in FIG. 3). Accordingly, the printed circuit board module 5d is connected to the printed circuit board module 5e via
  two Ethernet buses (transmission lines linking both the connector portions 23d to the connector portion 26e, and the connector portion 24d to the connector portion 25e); and two SATA buses (transmission lines linking both the connector portions 25d to the connector portion 24e, and the connector portion 26d to the connector portion 23e).

The printed circuit board module 5e is in turn connected to the printed circuit board module 5f via an Ethernet bus (transmission line linking the connector portions 27e to the connector portion 24f) and a SATA bus (transmission line linking the connector portion 28e to the connector portion 23f).

Advantageously, due to the short distance, the transmission lines between the module connectors 2d, 2e and 2f provide a high rate connection between printed circuit board modules 5d, 5e and 5f. Further, information is directly communicated between these printed circuit board modules 5d, 5e and 5f, without being routed via the switch 6 or the network.

In the illustrative backplane 1 shown in FIG. 3, three module connectors 2d, 2f and 2e are successively interconnected (or chained) by means of particular backplane buses (Ethernet bus and/or SATA bus), however it will be understood that the number of these module connectors, as well as the number and type (e.g. Ethernet or SATA) of the used backplane buses may vary depending upon the application in which the backplane 1 is used.

In one embodiment, one or more switches 6 are mounted to the backplane 1 and connected to appropriate connector portions of the module connectors 2d, 2e, and 2f.

In one embodiment, the printed circuit board module 2d, 2e and 2f may be
 a processing module, namely configured to perform given processing operations on received data; or
 a passive module, namely a pass-through module.

For instance, the printed circuit board module 5e comprises cross-connections of connector portions 21e-28e. As illustrative examples, once the printed circuit board module 5e is plugged into the module connector 2e,
 the connector portion 23e is cross-connected to the connector portion 21e (e.g. the SATA input connector 23e is cross-connected to the SATA output connector 21e);
 the connector portion 24e is cross-connected to the connector portion 28e (e.g. the SATA input connector 24e is cross-connected to the SATA output connector 28e);
 the connector portion 25e is cross-connected to the connector portion 22e (e.g. the Ethernet input connector 25e is cross-connected to the Ethernet output connector 22e); and
 the connector portion 26e is cross-connected to the connector portion 27e (e.g. the Ethernet input connector 26e is cross-connected to the Ethernet output connector 27e).

Those of skill in the art will appreciate that such cross-connections of connector portions by means of the printed circuit board modules permit various data processing operations such data storage duplication, redundancy in access to storage units, or data transfer from one printed circuit board module to another.

Figure 4:
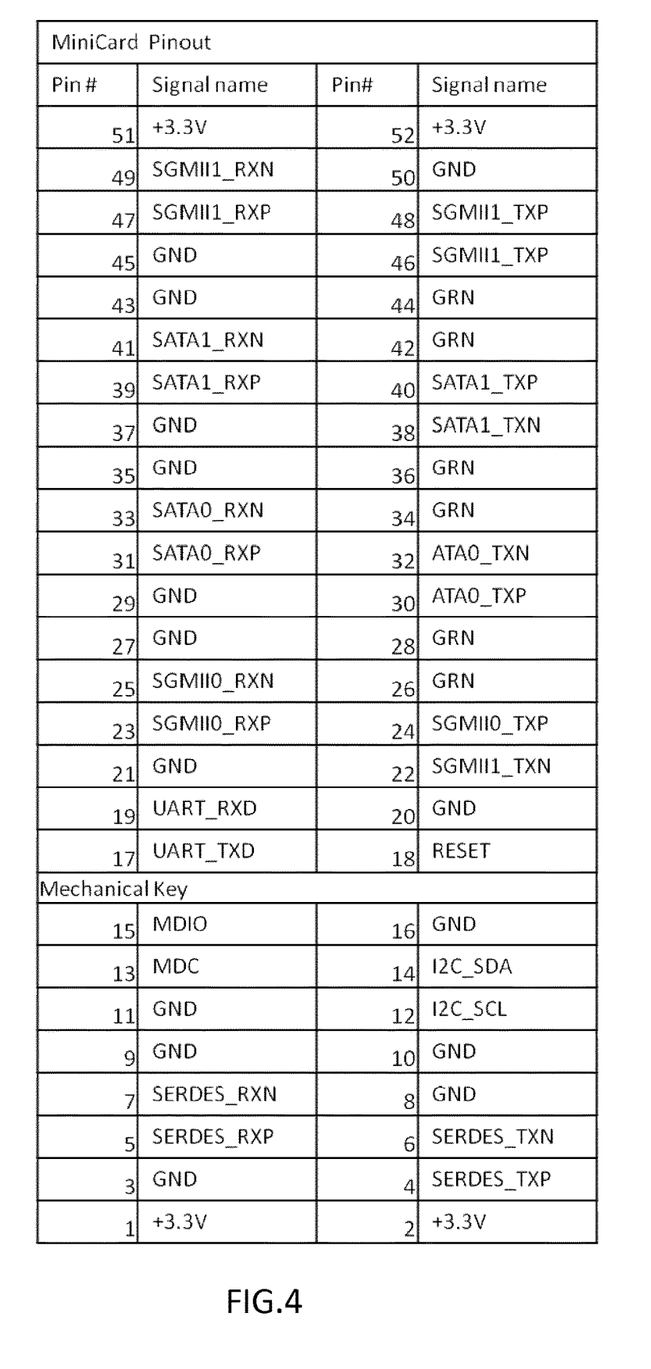
FIG. 4 is a block diagram illustrating a connector pinout according to an illustrative embodiment.

FIG. 4 illustrates Connector Pinout and Signal names between a MiniCard and correspondent module connector. In this case, the card edge connector comprises fifty two pins, wherein
 the connector portion composed of pins 4-7 is for stub SATA/Ethernet;
 the connector portion composed of pins 38 and 40 is reserved for outgoing signal from the printed circuit board module to the storage unit;
 the connector portion composed of pins 39 and 41 is reserved for incoming signal from the storage unit to the printed circuit board module;
 the connector portion composed of pin 17 is reserved for serial data transmission to another printed circuit board module mounted to the backplane;
 the connector portion composed of pin 19 is reserved for serial data reception from another printed circuit board module mounted to the backplane.

The definition of remaining pins is unchanged, as they are used in a conventional manner.

More generally, depending on specific implementations, the module connector and its correspondent card edge connector, as well as connector portions may include more or less pins than that of the above example.

In accordance with the above described embodiments, for connecting a first printed circuit board module plugged into a first module connector of a backplane to a second printed circuit board module plugged into a second module connector of the backplane, a connection step, through a first backplane bus (namely, a SATA bus or an Ethernet bus), of a predefined connector portion of the first module connector to a predefined connector portion of the second module connector is performed.

Further, for connecting the said second printed circuit board module to a third printed circuit board module plugged into a third module connector of the backplane, another connection step, through a second backplane bus (namely, a SATA bus or an Ethernet bus), of another predefined connector portion of the said second module connector to a predefined connector portion of the said third module connector is performed.

Advantageously, the above described backplane
 provides a modular and flexible configuration of module connectors so that enabling printed circuit board modules plugged thereinto to communicate and exchange data;
 enables easy and cost effective upgrade of outdated printed circuit board module, without having to replace the entire backplane;
 permits scalable printed circuit board modules deployment as their interconnection may be adapted in accordance with user needs.

The invention claimed is:
1. A backplane comprising:
 a first module connector configured to receive a first printed circuit board module, wherein the first printed circuit board module comprises at least one first processor;
 a second module connector configured to receive a second printed circuit board module, wherein the second printed circuit board module comprises at least one second processor;
 a first backplane connector configured to receive a first storage unit;
 a second backplane connector configured to receive a second storage unit; and
 a switch module;
 wherein the first module connector comprises: a first connector portion, a second connector portion, and a third connector portion;
 wherein the second module connector comprises: a fourth connector portion, a fifth connector portion, and a sixth connector portion, the first connector portion being connected to the fourth connector portion through a first backplane bus, the second connector portion being connected to the first backplane connector, the third connector portion being connected to the switch module, the fifth connector portion being connected to the second backplane connector, and the sixth connector portion being connected to the switch module; and wherein the first backplane bus is configured to allow information to be directly communicated between the first printed circuit board module and the second printed circuit board module without being routed beyond the first printed circuit board module and the second printed circuit board module.

2. The backplane of claim 1, wherein the second module connector further comprises a seventh connector portion, and wherein the backplane further comprises a third module connector configured to receive a third printed circuit board module, wherein the third module connector comprises an eighth connector portion, the seventh connector portion being connected to the eighth connector portion through a second backplane bus, the second backplane bus allowing information to be directly communicated between the second printed circuit board module and the third printed circuit board module without being routed beyond the second printed circuit board module and the third printed circuit board module.

3. The backplane of claim 1, wherein the first backplane bus is a SATA bus or an Ethernet bus.

4. The backplane of claim 2, wherein the second backplane bus is a SATA bus or an Ethernet bus.

5. The backplane of claim 1, wherein the switch module is configured to interconnect the first printed circuit board module and the second printed circuit board module.

6. The backplane of claim 1, wherein the switch module provides communications between the first printed circuit board module and the first storage unit.

7. The backplane of claim 1, wherein the first module connector comprises a card slot configured to receive a card edge connector of the first printed circuit board module.

8. The backplane of claim 1, wherein the first printed circuit board module is configured to perform processing operations on data stored by the first storage unit.

9. The backplane of claim 1, wherein the first backplane bus comprises a transmission line connecting the first connector portion of the first module connector with the fourth connector portion of the second module connector.

10. The backplane of claim 1, wherein the first backplane bus comprises a direct transmission line between the first module connector and the second module connector.

11. A data storage system comprising:
a first printed circuit board module comprising at least one first processor, wherein the first printed circuit board module is connected to a first module connector;
a second printed circuit board module comprising at least one second processor, wherein the second printed circuit board module is connected to a second module connector;
a first storage unit, wherein the first storage unit is connected to a first backplane connector;
a second storage unit, wherein the second storage unit is connected to a second backplane connector; and
a switch, wherein:
  the first printed circuit board module is in communication with the second printed circuit board module, information communicated between the first printed circuit board module and the second printed circuit board module is directly communicated without being routed by the switch,
  the first printed circuit board module is in communication with the first storage unit,
  the second printed circuit board module is in communication with the second storage unit,
  the first printed circuit board module is in communication with the switch,
  the second printed circuit board module is in communication with the switch,
  the first module connector comprises: a first connector portion, a second connector portion, and a third connector portion,
  the second module connector comprises: a fourth connector portion, a fifth connector portion, and a sixth connector portion, and wherein
  the first connector portion is connected to the fourth connector portion through a first backplane bus, the second connector portion is connected to the first backplane connector, the third connector portion is connected to the switch, the fifth connector portion is connected to the second backplane connector, and the sixth connector portion is connected to the switch.

12. The data storage system of claim 11, wherein the first backplane bus comprises a SATA bus.

13. The data storage system of claim 11, wherein the first backplane bus comprises an Ethernet bus.

14. The data storage system of claim 11, wherein the switch provides communications between the first printed circuit board module and the first storage unit.

15. The data storage system of claim 11, further comprising a third printed circuit board module, wherein the first printed circuit board module is in communication with the third printed circuit board module, and wherein information communicated between the first printed circuit board module and the third printed circuit board module is directly communicated without being routed by the switch.

16. The data storage system of claim 15, further comprising a third storage unit, wherein the third printed circuit board module is in communication with the third storage unit.

17. A data storage system comprising a plurality of backplanes, wherein each backplane of the plurality of backplanes comprises:
a first module connector removably coupled to a first printed circuit board module, wherein the first printed circuit board module comprises at least one first processor;
a second module connector removably coupled to a second printed circuit board module, wherein the second printed circuit board module comprises at least one second processor;
a first backplane connector configured to receive a first storage unit;
a second backplane connector configured to receive a second storage unit; and
a switch module;
wherein the first module connector comprises: a first connector portion, a second connector portion, and a third connector portion;
wherein the second module connector comprises: a fourth connector portion, a fifth connector portion, and a sixth connector portion, the first connector portion being connected to the fourth connector portion through a first backplane bus, the second connector portion being connected to the first backplane connector, the third connector portion being connected to the switch module, the fifth connector portion being connected to the second backplane connector, and the sixth connector portion being connected to the switch module; and wherein the first backplane bus is configured to allow information to be directly communicated between the first printed circuit board module and the second printed circuit board module without being routed beyond the first printed circuit board module and the second printed circuit board module.

18. The data storage system of claim 17, wherein the first backplane bus comprises a transmission line connecting the first connector portion corresponding to the first printed circuit board module with the fourth connector portion corresponding to the second printed circuit board module.

19. The data storage system of claim 17, wherein the first backplane bus is a SATA bus or an Ethernet bus.

* * * * *